United States Patent
Hartford

Patent Number: 5,480,007
Date of Patent: Jan. 2, 1996

[54] DISC BRAKE ROTOR

[75] Inventor: Dean J. Hartford, Wayne, Mich.

[73] Assignee: Kelsey-Hayes Company, Romulus, Mich.

[21] Appl. No.: 411,057

[22] Filed: Mar. 27, 1995

Related U.S. Application Data

[63] Continuation of Ser. No. 91,843, Jul. 7, 1993, abandoned.

[51] Int. Cl.$^6$ ..................................................... B60T 1/06
[52] U.S. Cl. ........................... 188/18 A; 188/218; 82/1.11
[58] Field of Search ................... 188/218, 218 A, 188/261, 18 A, 264 AA; 199/107 R; 409/132; 82/1.11, 112, 104, 123

[56] References Cited

U.S. PATENT DOCUMENTS

| | | | |
|---|---|---|---|
| 1,860,375 | 5/1932 | Winterer et al. | 188/261 X |
| 3,680,675 | 8/1972 | Livezey | 188/218 XL X |
| 3,809,192 | 5/1974 | Stehle | 188/218 XL |
| 4,156,479 | 5/1979 | Kawamura | 188/218 A |
| 4,286,694 | 9/1981 | Wiseman, Jr. et al. | 188/218 XL X |
| 5,078,248 | 1/1992 | Yeskik . | |

FOREIGN PATENT DOCUMENTS

| | | |
|---|---|---|
| 2308256 | 9/1974 | Germany . |
| 2837634 | 3/1980 | Germany . |
| 2096249 | 10/1982 | United Kingdom . |

*Primary Examiner*—Robert J. Oberleitner
*Assistant Examiner*—Lee W. Young
*Attorney, Agent, or Firm*—MacMillian, Sobanski & Todd

[57] ABSTRACT

A disc brake rotor produced by a machining method includes a friction disc having generally parallel inner and outer machined friction faces adapted to be frictionally engaged by a pair of brake pads of the disc brake assembly. Each of the inner and outer machined friction faces includes a spiral machining groove formed therein. When viewed from their respective faces, the spiral machining grooves are essentially identical to one another. The spiral machining groove formed in one of the inner and outer machined friction faces is operative during braking to produce a first force in one radial direction on one of the pair of brake pads. The spiral machining groove formed in the other one of the inner and outer machined friction faces is operative to produce a second force which is generally equal and in an opposite direction to the first on the other one of the pair of brake pads. As a result, the net radial force on the brake pads in mininized when the inner and outer machined friction faces are frictionally engaged by the brake pads.

4 Claims, 2 Drawing Sheets

DISC BRAKE ROTOR

This application is a continuation of 08/091843 filed Jul. 7, 1993, now abandoned.

BACKGROUND OF THE INVENTION

This invention relates in general to vehicle brakes and, in particular, to an improved rotor for use in a disc brake assembly, and method for finish machining the friction disc faces of the rotor.

A conventional hydraulic disc brake assembly includes a brake caliper and a rotor. The brake caliper is secured to an unsprung suspension component of the vehicle, and includes a pair of brake friction pads and a hydraulically actuated piston. The rotor is rotatably supported relative to the caliper, and includes a mounting flange and an outer annular friction disc. The friction disc defines generally parallel machined inner and outer faces adapted to be frictionally engaged by the friction pads. When the disc brake assembly is installed on a vehicle, the friction disc is disposed between the friction pads. When the piston is hydraulically actuated, the friction pads are urged into frictional engagement with the friction disc to brake the vehicle.

During the manufacture of the rotor, the inner and outer faces of the friction disc are machined during a final finishing operation to predetermined tolerances. Typically, this "finish machining" of the friction disc is accomplished by simultaneously grinding the inner and outer faces against a pair of grinding wheels, or by turning the faces on a lathe against a pair of conventional cutting tools. The "simultaneous" finish machining operation reduces the overall machining time and enables tighter tolerances to be maintained.

Conventionally, a "continuous" method for finish machining the inner and outer faces of the friction disc utilizes a CNC (computer numerical control) lathe. The CNC lathe includes a pair of cutters located on opposite sides of the friction disc, and initially positioned at either the extreme inner or outer diameter of the disc. During machining, the cutters are continuously moved in either an inward or outward radial direction (depending on their initial position) relative to the axis of the rotor as the rotor is turned. While appearing to produce substantially flat surfaces, the cutters are actually operative to machine a narrow shallow spiral groove in each of the inner and outer faces of the friction disc.

It is also known to finish machine the rotor friction disc faces by using an "interrupted" turning method. According to this method, the cutters machine in a radial direction relative to the axis of the rotor to a predetermined distance, at which point the cutters dwell for a single rotation of the rotor. This creates a single groove extending circumferentially around the friction disc a full 360°. The cutters continue on machining in the radial direction until the next predetermined distance is reached, at which point the cutters dwell for a single rotation of the rotor to form another, separate groove. This pattern is repeated throughout the finish machining operation to produce progressively smaller circumferential grooves.

SUMMARY OF THE INVENTION

This invention relates to an improved disc brake rotor and method for finish machining the friction disc faces.

The prior art machining methods produces a finished rotor having machining grooves which during braking, are operative to produce substantially equal forces in the same direction during frictional engagement of the friction disc by the brake pads. As a result of this, the brake pads tend to ride up (or down depending upon the direction of the grooves and the direction of rotation of the rotor) carrying the caliper along with them. When the brake pads and the caliper reach their maximum upward (or downward) travel, the brake pads, the caliper, or both fall down (or spring up) to their original positions. This cycle is repeated over and over until the brake pads create their own circumferential grooves in the faces of the friction disc. However, until this occurs, the repeated movement of the brake pads and/or the caliper creates an undesirable "knocking" noise during braking, especially when machined according to the above described prior art "continuous" process.

This invention concerns an improved rotor produced by a machining method which minimizes the net radial force on the brake pads to substantially reduce or all together eliminate knocking noise. In accordance with the present invention, one of the inner and outer machined friction faces is operative during braking to produce a first force in one radial direction on one of the pair of brake pads, and the other one of the inner and outer machined friction faces is operative to produce a second force which is generally equal and in an opposite radial direction to said first force on the other one of the pair of brake pads to thereby minimize the net radial force on the brake pads. As a result of this, knocking noise during braking is substantially reduced or all together eliminated.

Other advantages of this invention will become apparent to those skilled in the art from the following detailed description of the preferred embodiment, when read in light of the accompanying drawing.

DETAILED DESCRIPTION OF THE PREFERRED EMBODIMENT

Figure 1:
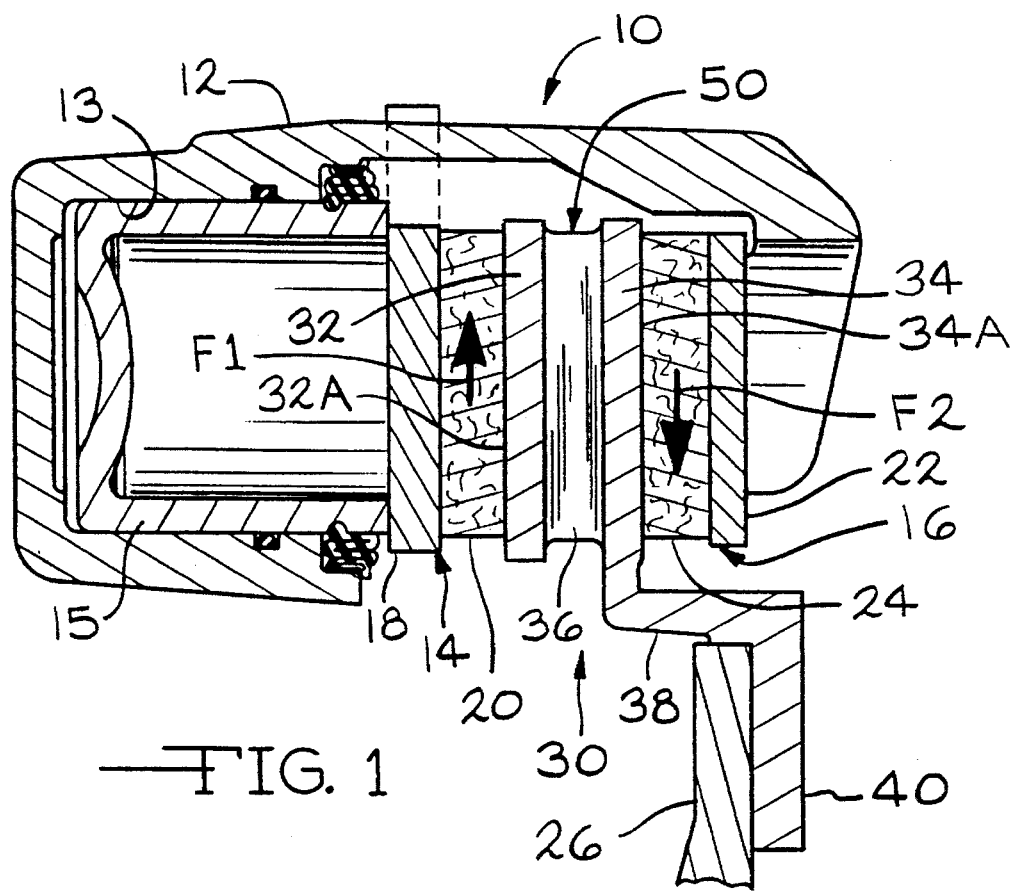
FIG. 1 a partial cross sectional view of a disc brake assembly including an improved disc brake rotor constructed in accordance with the present invention.

Referring now to the drawings, there is illustrated in FIG. 1 a partial view of a disc brake assembly, indicated generally at 10, and which incorporates an improved rotor 30 constructed in accordance with the present invention. The disc brake assembly 10 includes a generally C-shaped caliper 12 which supports an inboard brake pad assembly 14 and an outboard brake pad assembly 16, and can be of the kind disclosed in U.S. Pat. No. 4,391,355 to Evans, and herein incorporated by reference.

The inboard brake pad assembly 14 includes a backing plate 18 and a brake friction pad 20 secured thereto. The outboard brake pad assembly 16 includes a backing plate 22 and a brake friction pad 24 secured thereto. The caliper 12 further includes a bore 13, and a hydraulically actuated piston 15 disposed in the bore 13.

As shown in this embodiment, the rotor 30 is a vented type of rotor and includes an annular friction disc 50. The friction disc 50 includes generally parallel inner and outer faces 32 and 34, respectively, which define a pair of brake friction plates. The brake friction plates 32 and 34 are spaced apart and connected together by fins or ribs 36. The brake friction plate 32 defines an inboard brake friction plate and includes an outer surface 32A. The brake friction plate 34 defines an outboard brake friction plate and includes an outer surface 34A, which is generally parallel to the outer surface 32A.

The brake friction plate 34 includes a generally radially extending transition portion 38 which connects the plate 34, and therefore the plate 32, to a flange portion 40 of the rotor 30. The flange portion 40 defines a mounting surface and is provided with a centrally located aperture (not shown), and a plurality of bolt receiving holes (not shown) for securing the rotor 30 to a rotatable component of the vehicle, such as a flange 26 of a wheel spindle, partially shown in FIG. 1. As is known, when the piston 15 is hydraulically actuated, the outer surfaces 32A and 34A of the friction disc 50 are engaged by the friction pads 20 and 24 to brake the vehicle. Also, while shown as a vented rotor 30, other non-vented types can be used.

Figure 4:
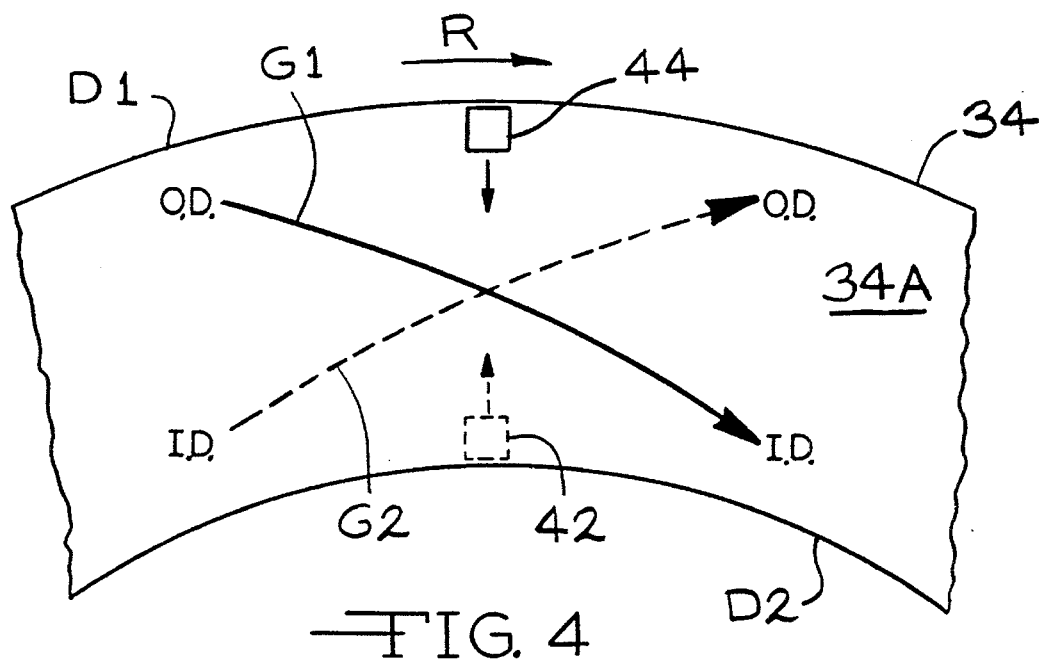
FIG. 4 is a partial front plan view of the friction disc and looking in the direction of lines 4—4 in FIG. 1.
Figure 2:
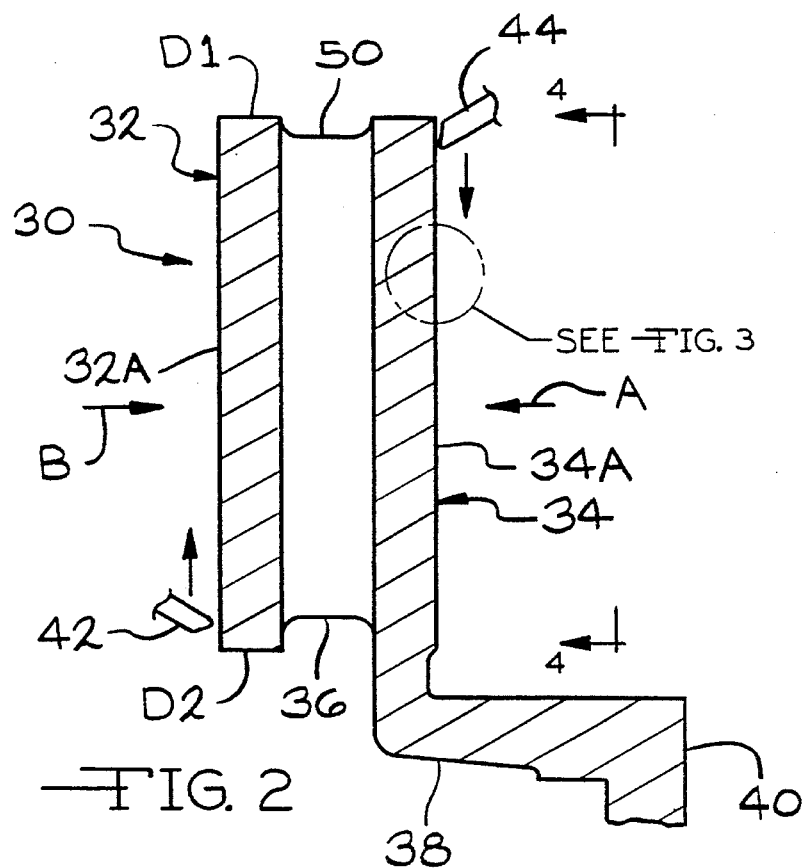
FIG. 2 is a partial cross sectional view of the disc brake rotor shown in FIG. 1, and showing the direction of the tools for finish machining the inner and outer faces of the friction disc of the rotor in accordance with the present invention.
Figure 3:
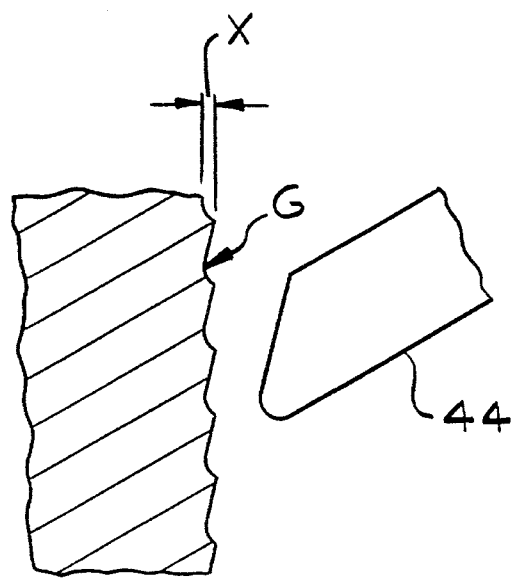
FIG. 3 is an enlarged detail view of a portion of the friction disc.

Turning now to FIGS. 2–4, the machining method for producing the rotor 30 will be discussed. In order to produce the rotor 30 of the present invention, the rotor is secured on a lathe (not shown), and the outer surfaces 32A and 34A of the inboard and outboard brake friction plates 32 and 34, respectively, are finish machined at the same time by a pair of cutting tools 42 and 44, partially shown in FIG. 2. In particular, the cutting tool 44 is operative to finish machine the outer surface 34A of the outboard brake friction plate 34 by moving in a generally radial direction from the outer diameter D1 of the plate to the inner diameter D2 thereof. The other cutting tool 42 is operative to finish machine the outer surface 32A of the inboard brake friction plate 32 by moving in a generally radial direction from the inner diameter D2 of the rotor to the outer diameter D1 thereof.

As the cutting tools 42 and 44 finish machine the outer surfaces 34A and 32A of the brake friction plates 34 and 32, respectively, a narrow shallow machining groove G having a spiral-like configuration is machined into the surfaces thereof. As best shown in FIG. 3, the shape of the groove G resembles the shape of the cutting tool, and the groove G extends into the surface of the rotor to a predetermined depth X.

FIG. 4 shows schematically the direction (exaggerated for clarity purposes), of the grooves which are machined into the surfaces of the rotor by the cutting tools 42 and 44. As shown therein, when the cutting tool 44 is advanced radially inwardly from the outer diameter D1 of the rotor to the inner diameter D2 thereof, a machining groove G1 is formed in the outer surface 34A of the outboard brake friction plate 34. The machining groove G1 extends generally radially inwardly in a clockwise direction as shown (or can be thought of as extending radially outwardly in a counterclockwise direction).

As the cutting tool 42 is advanced radially outwardly from the inner diameter D2 to the outer diameter D1, a groove G2 (shown by dashed line 44) is formed in the outer surface 32A of the inboard brake friction plate 32. The machining groove G2 extends generally radially outwardly in a counterclockwise direction as shown (or can be thought of as extending radially inwardly in a clockwise direction). Thus, when viewed from the same face of the rotor, the grooves G1 and G2 as shown extend in opposing directions (i.e., clockwise and counterclockwise), relative to one another.

It will be appreciated that the machining operation of the present invention produces spiral grooves in the outer surfaces 32A and 34A which, when viewed from its respective face (in the directions A and B, respectively, shown in FIG. 2), are essentially identical to one another. In the prior art machining methods, the resultant spiral grooves extend in either both the G1 or the G2 directions. Thus, when viewed from each respective face, the grooves are not identical to one another.

As a result of the generally opposing grooves G1 and G2, when the rotor 30 is rotating in a clockwise direction R (shown in FIG. 4) and the brakes are applied, the brake pads 20 and 24 frictionally engage the brake friction plates 32 and 34, respectively, and the grooves in the plates are effective to produce the substantially equal and opposite forces F1 and F2 shown in FIG. 1. As a result of these generally equal and opposite forces F1 and F2, the brake pad assemblies do not ride up (or down) carrying the caliper along with them as happens in the prior art continuous machining methods. Thus, the rotor 30 of the present invention is effective to minimize the net radial force on the brake pads thereby reducing or all together eliminating undesirable knocking noise during braking.

Also, the inner and outer faces 32A and 34A of the brake friction plates 32 and 34, respectively, are preferably turned at the same time. However, the inner and outer faces 32A and 34A could be finish machined during separate operations. In addition, while the present invention is especially advantageous for use in the prior "continuous" method, it can be used in the interrupted method.

In accordance with the provisions of the patent statutes, the principle and mode of operation of this invention have been described and illustrated in its preferred embodiment. However, it must be understood that the invention may be practiced otherwise than as specifically explained and illustrated without departing from its spirit or scope of the attached claims.

What is claimed:

1. A method for machining a disc brake rotor adapted for use in a disc brake assembly comprising the steps of:

(a) providing a disc brake rotor having a friction disc portion defining first and second generally parallel friction faces adapted to be frictionally engaged by a pair of brake pads of the disc brake assembly, each of said friction faces extending from an inner diameter to an outer diameter;

(b) mounting the disc brake rotor on a cutting machine having a cutting tool; and (c) operating the cutting machine to machine a groove in said first friction face by moving the cutting tool from the inner diameter of said first friction face to the outer diameter of said first friction face; and (d) operating the cutting machine to machine a groove in said second friction face by moving the cutting tool from the outer diameter of said second friction face to the inner diameter of said second friction face.

2. The method for machining a disc brake rotor defined in claim 1 wherein step (c) and step (d) are performed sequentially.

3. The method for machining a disc brake rotor defined in claim 1 wherein step (b) includes mounting the disc brake rotor on a cutting machine having a pair of cutting tools, and wherein step (c) is performed simultaneously with step (d) by said pair of cutting tools.

4. The method for machining a disc brake rotor defined in claim 1 wherein step (c) and step (d) are performed without removing the disc brake rotor from the cutting machine.

* * * * *